April 1, 1952  H. W. BLEWETT ET AL  2,590,922
MICROMETER BRACKET
Filed May 21, 1948
FIG. 1.
FIG. 2.
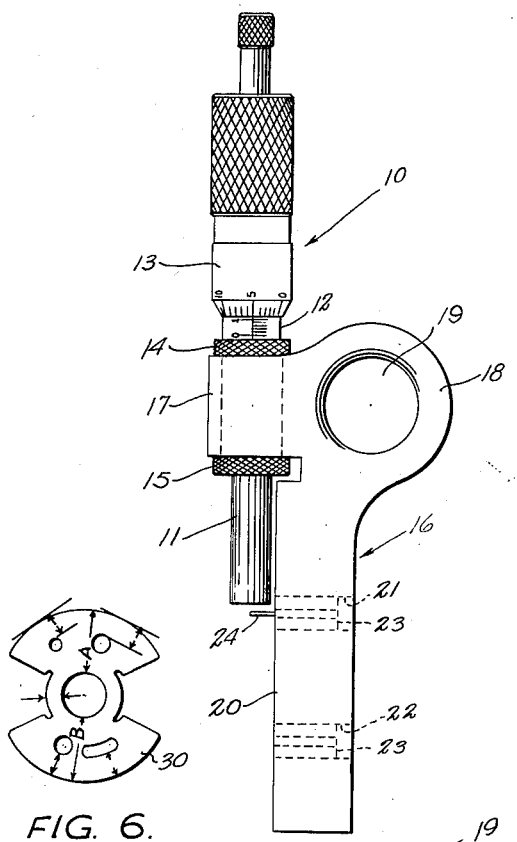
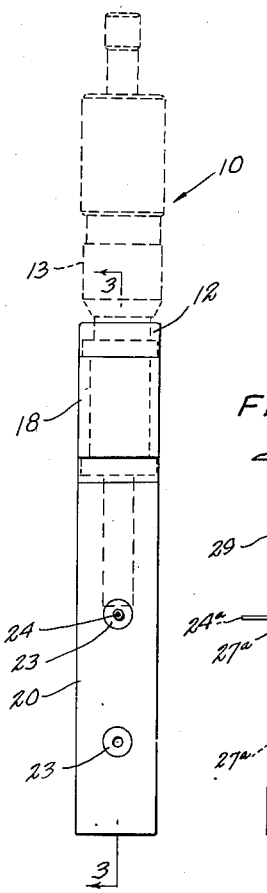
FIG. 4.
FIG. 6.
FIG. 3.
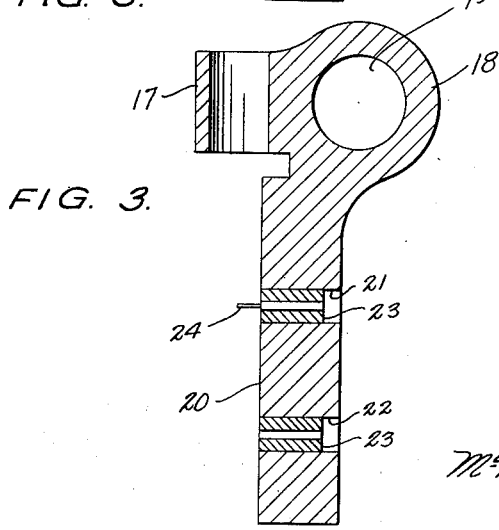
FIG. 5.
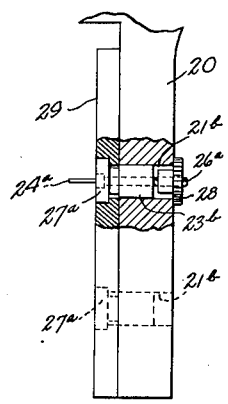
INVENTORS
HOWARD W. BLEWETT,
JOSEPH A. BERNARDINI,
BY
McMorrow, Berman & Davidson
ATTORNEYS.

Patented Apr. 1, 1952

2,590,922

UNITED STATES PATENT OFFICE 2,590,922

MICROMETER BRACKET

Howard W. Blewett, Ansonia, and Joseph A. Bernardini, New Haven, Conn.

Application May 21, 1948, Serial No. 28,394

3 Claims. (Cl. 33—167)

This invention relates broadly to measuring instruments and more particularly to micrometers for use in making fine measurements especially in the manufacture of machine blanks, dies, and the like, where accurate distance from a hole or slot to the edge of the work are desired and in general where the usual depth gauges are inapplicable.

An object of the invention is to provide a micrometer so arranged and constructed as to make possible accurate measurements of the depth of slots, distances from a hole to the edge of the work, wall thicknesses, and the like, in checking machine blanks, dies and other machine parts or selected objects.

Another object is to provide a frame and anvil of novel construction to support and cooperate with a micrometer head of standard or conventional design.

Further objects and advantages of this invention, as well as its construction, arrangement and operation, will become apparent from the following description when taken in connection with the accompanying drawings, in which:

Figure 1 is a side elevation of the device of this invention showing a micrometer head mounted thereon.

Figure 2 is a rear elevation.

Figure 3 is a sectional side elevation, taken on line 3—3 of Figure 2.

Figure 4 is a fragmentary side elevation, partly in section, showing a modification of the contact plate and anvil pin.

Figure 5 is a fragmentary side elevation, partly in section, showing a modification of the anvil pin.

Figure 6 shows a machined blank and indicates measurement to be checked.

As shown in Figure 1, a micrometer head indicated generally as 10, comprising in part a reciprocating spindle 11, sleeve 12, and thimble 13, is adjustably mounted by means of nuts 14 and 15 in the boss or sleeve 17 of the bracket or frame designated generally as 16.

The frame or bracket 16 consists of a bored boss or sleeve 17, an offset boss 18 containing a transverse aperture 19 preferably circular in outline and preferably for the accommodation of one of the fingers of the operator, and a shank 20.

In the shank 20 are provided two holes 21 and 22 each adapted to selectively contain a bushing 23 and anvil pin 24, the bushing may be force-fitted and retained in the holes 21 and 22 by friction as indicated in Figures 1 and 3. The anvil pin 24 should snugly fit the bushings and may be selectively inserted in either of them depending on the nature of the work to be measured.

In Figure 5 is shown a modification in which the anvil pin 24a is provided with a shoulder 25 and a threaded shank 26. The bushing 23a is provided with a head 27 set flush with the surface of the shank 20. A threaded nut 28 serves to retain the pin 24a and bushing 23a in the bore 21a.

In Figure 4 is shown a further modification in which a face plate 29 of suitable material to withstand wear is secured to the face of the shank 20 by means of a modified bushing 23b which is provided with a head 27a set flush in a counterbore in the face plate 29 and retained by force-fitting the bushing 23b in the bore 21b of the shank 20. The modified anvil pin 24a is secured in place as before by means of threaded shank 26a and nut 28.

The purpose of the anvil pin 24 and 24a extending perpendicularly to the face of shank 20 or face plate 29, is to permit insertion of the pin in a hole or slot to obtain the accurate distance from the edge of the hole or the bottom of the slot to the edge of the work. The outer projecting end of the anvil pin 24 and 24a may be of any suitable diameter, but it has been found that a diameter of .05 inch is satisfactory for most purposes.

Measurements, not possible with micrometers of the conventional type, may be made with the device of this invention such as, for example, checking measurement of a complex blank 30, Figure 6, which contains holes, slots and contours all measurable from their edges to the outer edge of the blank, as indicated by letters A and B and the arrows, by inserting the anvil pin 24 or 24a in proper position in the hole or slot, bringing the micrometer spindle 11 into contact with the outer edge of the blank and reading the required dimension on the scales of the sleeve 12 and thimble 13. To obtain the distance from the center of a hole to the edge of the work one-half the diameter of the hole may be added to the dimension obtained from the edge of the hole to the outer edge of the blank, as at A and B in Figure 6.

It will be understood that various changes and modifications may be made in this invention without departing from the spirit and scope thereof, as set forth in the appended claims.

What is claimed is:

1. The combination with a micrometer head including a spindle, of a frame comprising a sleeve portion having an axial bore therethrough, an elongated shank portion having one end carried by said sleeve portion and extending in a parallel spaced relation with respect to the longitudinal axis of said sleeve portion, the spindle of said micrometer head being operatively received within the axial bore of said sleeve portion, said shank portion being provided with a plurality of openings extending transversely therethrough and disposed at varying distances from the free end of said spindle, and means mounted in said openings for cooperating with the free end of the spindle of said micrometer head for purposes of measurements, said means comprising a bushing having an axial opening therethrough and an anvil pin insertible within and fixedly supported in said axial opening.

2. The combination with a micrometer head including a spindle, of a frame comprising a sleeve portion having an axial bore therethrough, an elongated shank portion having one end carried by said sleeve portion and extending in a parallel spaced relation with respect to the longitudinal axis of said sleeve portion, the spindle of said micrometer head being operatively received within the axial bore of said sleeve portion, said shank portion being provided with a plurality of openings extending transversely therethrough and disposed at varying distances from the free end of said spindle, and means mounted in said openings for cooperating with the free end of the spindle of said micrometer head for purposes of measurements, said means comprising a bushing having an axial opening therethrough and counterbored at one end, an anvil pin insertible through said axial opening, said anvil pin being threaded at one end and being provided with a raised shoulder at its opposite end, and a nut threadedly attached to the threaded end of said anvil pin.

3. The combination with a micrometer head including a spindle, of a frame comprising a sleeve portion having an axial bore therethrough, an elongated shank portion having one end carried by said sleeve portion and extending in a parallel spaced relation with respect to the longitudinal axis of said sleeve portion, the spindle of said micrometer head being operatively received within the axial bore of said sleeve portion, said shank portion being provided with a plurality of openings extending transversely therethrough and disposed at varying distances from the free end of said spindle, and means mounted in said openings for cooperating with the free end of the spindle of said micrometer head for purposes of measurements, said means comprising a bushing having an axial opening therethrough and provided with a counterbore head portion at one end thereof, a face plate arranged intermediate said shank portion and said spindle secured to the bushing by the counterbored head portion of the latter, an anvil pin insertible through said axial opening, said anvil pin being threaded at one end and being provided with a raised shoulder at its opposite end, and a nut threadedly attached to the threaded end of said anvil pin.

HOWARD W. BLEWETT.
JOSEPH A. BERNARDINI.

REFERENCES CITED

The following references are of record in the file of this patent:

UNITED STATES PATENTS

| Number | Name | Date |
| --- | --- | --- |
| 261,201 | Bristol | July 18, 1882 |
| 925,280 | Bosworth | June 15, 1909 |
| 1,176,567 | Kamowske | Mar. 21, 1916 |
| 1,226,396 | Slocomb | May 15, 1917 |
| 1,617,443 | Erickson et al. | Feb. 15, 1927 |